US011072074B2

(12) United States Patent
Shivaram et al.

(10) Patent No.: US 11,072,074 B2
(45) Date of Patent: Jul. 27, 2021

(54) CALIBRATION AND OPERATION OF VISION-BASED MANIPULATION SYSTEMS

(71) Applicant: COGNEX CORPORATION, Natick, MA (US)

(72) Inventors: Guruprasad Shivaram, Wellesley, MA (US); Gang Liu, Natick, MA (US)

(73) Assignee: COGNEX CORPORATION, Natick, MA (US)

( * ) Notice: Subject to any disclaimer, the term of this patent is extended or adjusted under 35 U.S.C. 154(b) by 649 days.

(21) Appl. No.: 15/840,495

(22) Filed: Dec. 13, 2017

(65) Prior Publication Data

US 2019/0176335 A1    Jun. 13, 2019

(51) Int. Cl.
*B25J 9/16*     (2006.01)
*H04N 7/18*    (2006.01)

(52) U.S. Cl.
CPC ........... *B25J 9/1692* (2013.01); *B25J 9/1697* (2013.01); *H04N 7/181* (2013.01)

(58) Field of Classification Search
CPC ........ B25J 9/1692; B25J 9/1697; H04N 7/181
USPC ........................................................ 700/254
See application file for complete search history.

(56) References Cited

U.S. PATENT DOCUMENTS

| | | | | |
|---|---|---|---|---|
| 4,639,878 A * | 1/1987 | Day | ............... | G01B 11/002 348/94 |
| 4,815,006 A * | 3/1989 | Andersson | ........... | B23K 9/1274 700/254 |
| 5,329,469 A * | 7/1994 | Watanabe | ............. | B25J 9/1697 348/95 |
| 5,960,125 A | 9/1999 | Michael et al. | | |
| 6,901,673 B1 | 6/2005 | Cobb et al. | | |
| 7,336,814 B2 * | 2/2008 | Boca | ........................ | G06K 9/32 382/141 |
| 9,230,326 B1 | 1/2016 | Liu | | |
| 10,565,737 B1 * | 2/2020 | Islam | .................... | H04N 17/002 |
| 2003/0144765 A1 * | 7/2003 | Habibi | ................... | B25J 9/1697 700/259 |
| 2011/0280472 A1 * | 11/2011 | Wallack | ................... | G06T 7/80 382/153 |
| 2012/0253512 A1 * | 10/2012 | Sato | ....................... | B25J 9/1661 700/245 |
| 2013/0147944 A1 * | 6/2013 | Zhang | ...................... | G06T 7/80 348/95 |

(Continued)

FOREIGN PATENT DOCUMENTS

| | | |
|---|---|---|
| JP | 2003117860 A | 4/2003 |
| JP | 2009006452 A | 1/2009 |

(Continued)

OTHER PUBLICATIONS

Cognex Corporation, AlignPlus Vision-Guided Motion Control Datasheet, Copyright 2016 Cognex Corporation, 2 pages.

*Primary Examiner* — Ryan Rink
(74) *Attorney, Agent, or Firm* — Quarles & Brady LLP

(57) ABSTRACT

A vision-based manipulations system can be configured for, and can be operated with methods including, performing hand-eye calibrations at multiple workstations of the system, performing a cross-station calibration for the system, and determining relationships between the hand-eye calibrations and the cross-station calibration. In some embodiments, the system can be used to move a work object between the workstations based on the cross-station calibration.

20 Claims, 3 Drawing Sheets

(56) References Cited

U.S. PATENT DOCUMENTS

| | | | |
|---|---|---|---|
| 2014/0121836 A1* | 5/2014 | Ban | B25J 9/0093 |
| | | | 700/259 |
| 2014/0147240 A1* | 5/2014 | Noda | B25J 19/021 |
| | | | 414/751.1 |
| 2014/0240520 A1 | 8/2014 | Liu et al. | |
| 2014/0267681 A1 | 9/2014 | Liu et al. | |
| 2014/0277711 A1* | 9/2014 | Tomo | B25J 9/1612 |
| | | | 700/245 |
| 2015/0019006 A1* | 1/2015 | Yoshida | B25J 9/1697 |
| | | | 700/230 |
| 2016/0039096 A1* | 2/2016 | Wallack | G06T 7/80 |
| | | | 702/104 |
| 2017/0024613 A1* | 1/2017 | Shivaram | G06K 9/3216 |
| 2017/0132807 A1* | 5/2017 | Shivaram | B25J 9/1697 |
| 2018/0161983 A1* | 6/2018 | Yamaguchi | B25J 19/023 |
| 2018/0161984 A1* | 6/2018 | Ishige | B25J 19/023 |
| 2019/0084160 A1* | 3/2019 | Wallack | G06T 7/80 |
| 2019/0176335 A1* | 6/2019 | Shivaram | H04N 7/181 |
| 2020/0139550 A1* | 5/2020 | Patre | G06T 7/80 |

FOREIGN PATENT DOCUMENTS

| | | | |
|---|---|---|---|
| JP | 2014087913 A | 5/2014 | |
| WO | 2011071813 A1 | 6/2011 | |
| WO | 2011163209 A2 | 12/2011 | |

\* cited by examiner

CALIBRATION AND OPERATION OF VISION-BASED MANIPULATION SYSTEMS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to calibration and operation of systems for controlled manipulation of objects, such as robotic systems for manufacturing that can be controlled, at least in part, based on associated machine vision systems.

To support accurate execution of manufacturing (or other) tasks, such as positioning of assembly parts during assembly operations, it can be useful to relatively precisely define one or more coordinate systems for a controllable robot (or other controllable motion system), as well as the relationships between them (e.g., mathematical transforms from one coordinate system to another). In many settings, machine vision systems can assist in this endeavor. For example, one or more cameras (e.g., fixed or mobile cameras) can be associated with a particular robot (or robots), a particular manufacturing workstation (or workstations), and so on. Using machine vision algorithms, the cameras can be used to help guide operations of the robot, including assembly and other manufacturing operations. Collectively, an arrangement of one or more cameras, and one or more associated robots (or other controllable motion systems) will be referred to herein as a vision-based manipulation ("VBM") system.

When calculating positions and/or movements for particular operations, different components of a VBM system may generally rely on (or refer to) one or more of several different coordinate systems, which are often related to a common unified reference coordinate system, sometimes referred to as a "motion" coordinate system. For example, a robot for a VBM system may execute movements based on an internal (virtual) coordinate system, while a camera of a VBM system may capture images on a two dimensional ("2D") pixel coordinate system. In some implementations, an internal coordinate system of a particular robot can be used as the motion coordinate system, to which the pixel coordinate system can be related by one or more mathematical transforms.

If a robot (or other motion system) is perfectly manufactured and maintained, commanded movements relative to the relevant motion coordinate system may result in perfectly replicated actual movements by a manipulator (or other component) of the robot in real physical space. However, real-world robots can exhibit internal inaccuracies or other faults, which can result in error between a commanded (and expected) movement within the motion coordinate system, and the actual movement of the robot in real space. Correspondingly, this can result in parts of the robot being differently located in real space than they are in the virtual space of the motion coordinate system. This is turn can lead to inaccuracies or other errors during manufacturing (or other) operations.

BRIEF SUMMARY OF THE INVENTION

Some embodiments of the invention include a method of calibrating a VBM system that includes a first workstation, a second workstation at least partly separate from the first workstation, a camera system configured to capture images of one or more work objects in the first and second workstations, and a controllable motion system. The method can include performing a hand-eye calibration with the controllable motion system and the camera system at the first workstation and at the second workstation. A cross-station calibration can be performed for the controllable motion system and the first and second workstations. A relationship between the cross-station calibration and the hand-eye calibration of the first workstation can be determined, as can a relationship between the cross-station calibration and the hand-eye calibration of the second workstation.

Some embodiments of the invention include a method of using a VBM system to execute an operation with a work object at a first workstation and at a second workstation that is at least partly separate from the first workstation, where the VBM system includes a camera system configured to capture images of one or more objects in the first and second workstations, and a controllable motion system configured to command movements within a motion coordinate system, and where the camera system and the controllable motion system defining a first hand-eye calibration for the first workstation and a second hand-eye calibration for the second workstation. The method can include performing a cross-station calibration to determine a first cross-calibration relationship between a calibration-object coordinate system and the first hand-eye calibration and to determine a second cross-calibration relationship between the calibration-object coordinate system and the second hand-eye calibration, the calibration relationship being determined based on a calibration object that is gripped by the controllable motion system and imaged at the first workstation and at the second workstation. One or more features of the work object can be located at the first workstation, using the camera system. A cross-station transform for moving the work object to a target location at the second workstation can be calculated, based at least partly on the cross-station calibration. The work object can be moved to the target location, using the controllable motion system, based on the calculated cross-station transform.

Some embodiments of the invention include a computer-based method of calibrating a computer system for automated control of a controllable motion system of a VBM system, with the VBM system including the controllable motion system, a first workstation, a second workstation at least partly separate from the first workstation, and a camera system configured to capture images of one or more work objects in the first and second workstations. As such, operations included in the method can be implemented, with varying degrees of automation, by one or more computer systems utilizing one or more processor devices.

Some embodiments of the invention include a VBM system that includes a first workstation, a second workstation that is at least partly separate from the first workstation, a camera system configured to capture images of one or more work objects in the first and second workstations, a controllable motion system configured to command movements within a motion coordinate system, and one or more processor devices. The one or more processor devices can be configured to: perform a first hand-eye calibration for the camera system and the controllable motion system at the first workstation, to perform a second hand-eye calibration for the camera system and the controllable motion system at the second workstation, and to perform a cross-station calibration to determine a first cross-calibration relationship between a calibration-object coordinate system and the first hand-eye calibration and a second cross-calibration relationship between the calibration-object coordinate system and the second hand-eye calibration. The calibration relationship can be determined based on causing the camera system to acquire, at the first workstation and at the second workstation, one or more images of a calibration object that is gripped by the controllable motion system.

DETAILED DESCRIPTION OF THE INVENTION

Figure 1:
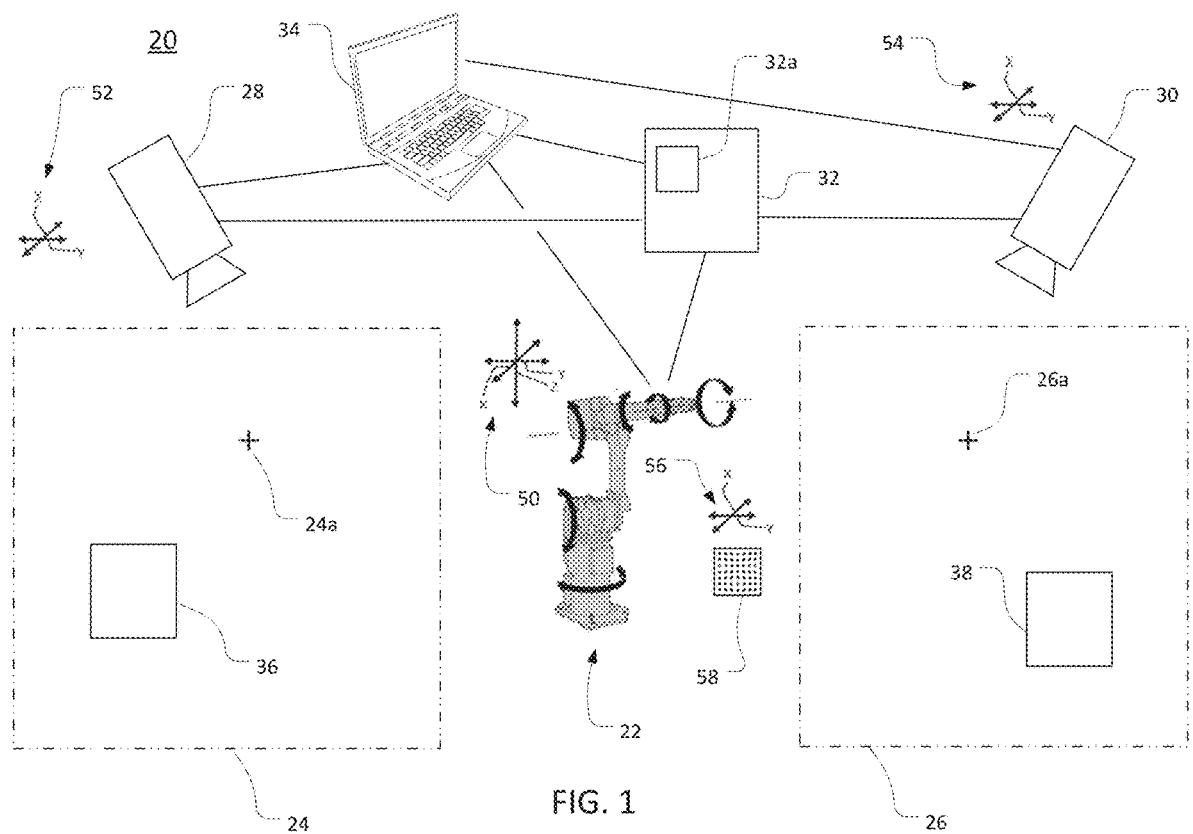
FIG. 1 is a schematic diagram illustrating a VBM system configured for calibration and operation across multiple workstations, according to some embodiments of the invention.

In the following detailed description, reference is made to the accompanying drawings that form a part hereof. In the drawings, similar symbols typically identify similar components, unless context dictates otherwise. The example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

In some implementations, aspects of the invention, including computerized implementations of methods according to the invention, can be implemented as a system, method, apparatus, or article of manufacture using standard programming and/or engineering techniques to produce software, firmware, hardware, or any combination thereof to control a computer or processor based device to implement aspects detailed herein. The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to these configurations without departing from the scope or spirit of the claimed subject matter.

Embodiments of the invention can be implemented as systems and/or methods, including computer-implemented methods. Some embodiments of the invention can include (or utilize) a device such as an automation device, a special purpose or general purpose computer including various computer hardware, software, firmware, and so on, consistent with the discussion below.

As used herein, unless otherwise specified or limited, "at least one of A, B, and C," and similar other phrases, are meant to indicate A, or B, or C, or any combination of A, B, and/or C. As such, this phrase, and similar other phrases can include single or multiple instances of A, B, and/or C, and, in the case that any of A, B, and/or C indicates a category of elements, single or multiple instances of any of the elements of the category (or categories).

Also as used herein, unless otherwise specified or limited, the terms "component," "system," "module," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components (or system, module, and so on) may reside within a process and/or thread of execution, may be localized on one computer, distributed between two or more computers or processors, and/or included within another component (or system, module, and so on).

Also as used herein, unless otherwise specified or limited, a "camera" can include any type of imaging device, including 2D planar imaging devices, line scan imaging devices, 3D imaging devices, video imaging devices, and so on, as well as devices configured to capture images from visible and/or non-visible light. In this regard, a "camera system" can include a system with one or more cameras. Similarly, unless otherwise specified or limited, to "grip" can indicate an action that results in the fixing or holding of a work object by a manipulator or other device, including through mechanical, suction, magnetic, or other engagement.

Execution of certain processes, such as assembly or other tasks in precision manufacturing, may require the use of automated, computer-controlled motion systems. For example, in order to precisely assemble certain components of electronic systems, a controlling computer system may be required to implement relatively precise automated control of a series of independent and/or inter-related movements of a robot with a gripping arm. Inherently, in order to execute such control with appropriate accuracy, the computer system must be able to command movements of the robot, relative to a reference coordinate system (or systems) used by internal controllers of the robot, with high confidence that the commands relative to the reference coordinate system(s) will appropriately correspond to desired movements of the robot in the physical space of the relevant manufacturing area. Accordingly, for effective automated execution of precision tasks, the computer system must be configured to determine an appropriately accurate relationship between one or more reference coordinate systems relating to a robot (or other motion system) and one or more coordinate systems of the relevant physical environment.

In this regard, and as also discussed above, inaccuracies in movements by robots or other controllable motion systems (i.e., inaccuracies in actual movements versus commanded movement in the relevant coordinate system) can adversely affect manufacturing and other operations. For example, where certain types of inaccuracies are present in controllable motion systems, conventional approaches for computer systems to determine relationships between reference and physical coordinate systems can result in significant inaccuracies in those relationships. As a result, the actual physical movements of motion systems in response to commands from the computer systems may not accurately correspond to the physical movements that were intended by the commands.

Inaccuracies in controllable motion systems, as may adversely affect automated computer control of those systems can take a variety of forms. In some cases, such inaccuracies may be relatively prevalent with regard to large-scale movements (e.g., rather than with regard to small-scale movements). For example, a robot for a particular VBM system may be relatively accurate over relatively small (e.g., millimeter) scale movements at a first workstation and at a second workstation, but may be relatively inaccurate over larger (e.g., meter) scale movements between the two workstations. In this regard, for example, a robot may execute a relatively large scale commanded translational motion with some amount of rotational error, or may exhibit other errors (e.g., scale, aspect ratio, skew, shear, or other linear errors).

In some cases, the large-scale errors noted above can result in relatively poor performance of tasks that require movement between the workstations (e.g., attachment of a part from the first workstation to a different part at the second workstation). Usefully, however, because of the nature of the source of these errors (e.g., relatively unchanging physical aspects of the relevant robot), they may be generally repeatable. As further discussed below, this can allow the errors to be effectively removed via specific approaches to the above-noted necessary determination of relationships between reference and physical coordinate systems, as needed to implement automated computer control of controllable motion systems, in accordance with different embodiments of the present invention.

In particular, for example, in order to improve accuracy of robot (or other) operations, a series of calibrations can be executed for a multi-station VBM system. In some implementations, for example, a robot can be configured to execute operations at two (or more) workstations that are separated from each other by some relatively large distance (e.g., 1 m or more). In order to coordinate robot operations at the first and second workstations, for example, a separate hand-eye calibration ("HEC") can be executed for the robot at each of the workstations. In this way, for example, the local movements of robot within the motion coordinate system can be correlated to the coordinate system (e.g., 2D pixel coordinate system) of each relevant camera. Certain known aspects of HEC operations are discussed in U.S. Pat. Nos. 5,960,125 and 9,230,326 and U.S. Patent Publications 2017/0132807, U.S 2014/0267681, and 2014/0240520, all of which are incorporated by reference herein.

In addition to the noted HEC calibrations, a cross-station calibration ("CSC") can also be performed, to determine relationships between a calibration-object coordinate system and cameras (or camera field-of-views) at the two different workstations. This may be useful, for example, in order to account for discrepancies in actual robot movements versus robot commands, as compared between the two workstations. For example, a calibration plate (or other object) gripped by the robot can be imaged at a predetermined point within each workstation, and a CSC calculated accordingly. The relationship between the CSC and the HEC can then also be determined, such that coordinates or movements within the calibration-object coordinate system can be readily transformed to corresponding coordinates or movements within the relevant motion coordinate system (e.g., the coordinate system of the relevant robot).

With the CSC and HEC coordinate systems having been established (e.g., as outlined above), as well as the relationship between them, it may then be possible to implement relatively precise control of the relevant robot, even for operations that span both workstations. For example, in order to execute a pick operation on a first part at the first workstation and a corresponding place operation relative to a second part at the second workstation, features of the first and second parts can be identified in the CSC coordinate system. A transform to assemble the parts within the calibration-object coordinate system can then be calculated accordingly, as well as a transform from the calibration-object coordinate system to the motion coordinate system (e.g., based on transforms determined from the CSC, and from the first HEC), and the first part picked accordingly. In this way, for example, an appropriate set of commands for robot motion can be determined to pick the first part at the first workstation and to move the first part to the desired location in the second workstation.

In some embodiments, in order to potentially improve the accuracy of a "place" operation, once the first part has been picked at the first workstation, it can be moved to a predetermined point at the first workstation (e.g., the same predetermined point used to execute the CSC), and the features of the first part again located (e.g., located in the calibration-object coordinate system based on imaging with one or more cameras). This can be useful, for example, in order to confirm appropriate gripping of the first part by the robot. As appropriate, an updated transform can then be calculated, using the results of the CSC and the second HEC, in order to move the first part from the predetermined point at the first workstation to the target location (e.g., on the second part) in the second coordinate system.

Generally, aspects of the present disclosure are discussed herein with regard to examples that include two workstation VBM systems, with a single robot, and a single, unique, fixed-location, 2D camera at each station. It will be recognized by those of skill in the art that the principles underlying these aspects can be readily extended to other types of VBM systems (e.g., systems with mobile cameras or 3D cameras, systems with multiple robots, systems with three or more workstations, and so on).

Similarly, the particular coordinate systems and the transforms therebetween that are discussed herein are generally presented as examples only. In other implementations, use of other coordinate systems and transforms may be possible, under the same general principles of this disclosure. For example, some discussion herein may refer to locating part features (or other relevant points) in a calibration-object coordinate system and computation of corresponding transforms from that coordinate system to others. In other implementations, for example, part features (or other relevant points) can be located in a different coordinate system and corresponding transforms implemented accordingly.

Further, in some examples herein, the internal coordinate system of particular controllable motion systems may be adopted as the motion coordinate system for relevant VBM systems. However, it will be understood that a unified reference coordinate system may not necessarily be tied to a particular controllable motion system. For example, for some VBM systems, a unified reference coordinate system may vary from one or more internal coordinate systems for one or more controllable motion systems of the VBM systems, with appropriate transforms accordingly defining relationships between the unified reference coordinate system and the one or more internal coordinate systems.

In this light, and as one example of an implementation of the principles of the invention, FIG. 1 illustrates a VBM system 20 that includes a controllable motion system configured as a six-axis robot 22, a first workstation 24, a second workstation 26 separated from the first workstation by a known distance (e.g., 175 cm), a fixed-location, 2D first camera 28 configured to capture images of the first workstation 24 (e.g., images of work objects in the workstation 24), and a fixed-location 2D second camera 30 configured to capture images of the second workstation 26 (e.g., images of work objects in the workstation 26).

The system 20 also includes a controller 32, which can include a processing device 32a and can generally be configured to receive signals from and transmit signals to one or more of the first camera 28, the second camera 30, the robot 22, a general (or special) purpose computer 34, and various other components (including components of other VBM systems). Accordingly, the controller 32, which can be a standalone device or part of one or more of the components noted above, can be used to control various aspects of operation of the VBM system 20 and/or receive useful data from one or more components of the VMB system 20.

Generally, the robot 22 is configured to conduct operations in both the first workstation 24 and the second workstation 26. For example, the robot 22 can be configured to grip work objects (i.e., objects that are used to perform tasks, or on which tasks are performed) in either workstation 24, 26 (e.g., generally flat objects 36, 38 such as components of a touch-screen display), to move objects within the workstations 24, 26 (e.g., to predetermined points 24a and 26a), and to move objects between the workstations 24, 26. Accordingly, for example, the robot 22 generally can be useful to pick the object 36 (or other object) from the first workstation 24 and place the object 36 on the object 38 (or at another location) in the second workstation 26, among various other operations.

In the configuration generally outlined above and generally illustrated in FIG. 1, the VBM system 20 defines a number of different coordinate systems. For example, the robot 22 is generally controlled (e.g., by the controller 32) with respect to a motion coordinate system 50, the first camera 28 captures images within a pixel coordinate system 52, the second camera 30 captures images within a pixel coordinate system 54, a real-world coordinate system at either or both of the workstations 24, 26 (not shown), and so on. As also discussed below, it may be possible to establish a calibration-object coordinate system (or systems) 56 based on a calibration plate 58 (or other calibration object or objects).

As also noted above, the different coordinate systems illustrated in FIG. 1 are presented as examples only. For example, some implementations of the invention can utilize 3D cameras (e.g., laser profilers, time-of-flight sensors, and so on), such that a 3D pixel coordinate system may be defined. Similarly, in some embodiments, a calibration-object coordinate system may be 3D, rather than planar. Additionally, in some implementations, a coordinate system other than the coordinate system 50 may be chosen as the unified coordinate system.)

In the embodiment illustrated, the calibration plate 58 is configured as a generally flat object with distinctive dot grids made visible on its surface. Other example patterns include line grids (e.g., checkerboards or axes), honeycomb patterns, a checkerboard of triangles, and so on. Generally, as in the plate 58, characteristics of each visible feature are known from a particular plate's design, such as the position and/or orientation relative to a reference position and/or coordinate system implicitly defined within the design.

Figure 2:
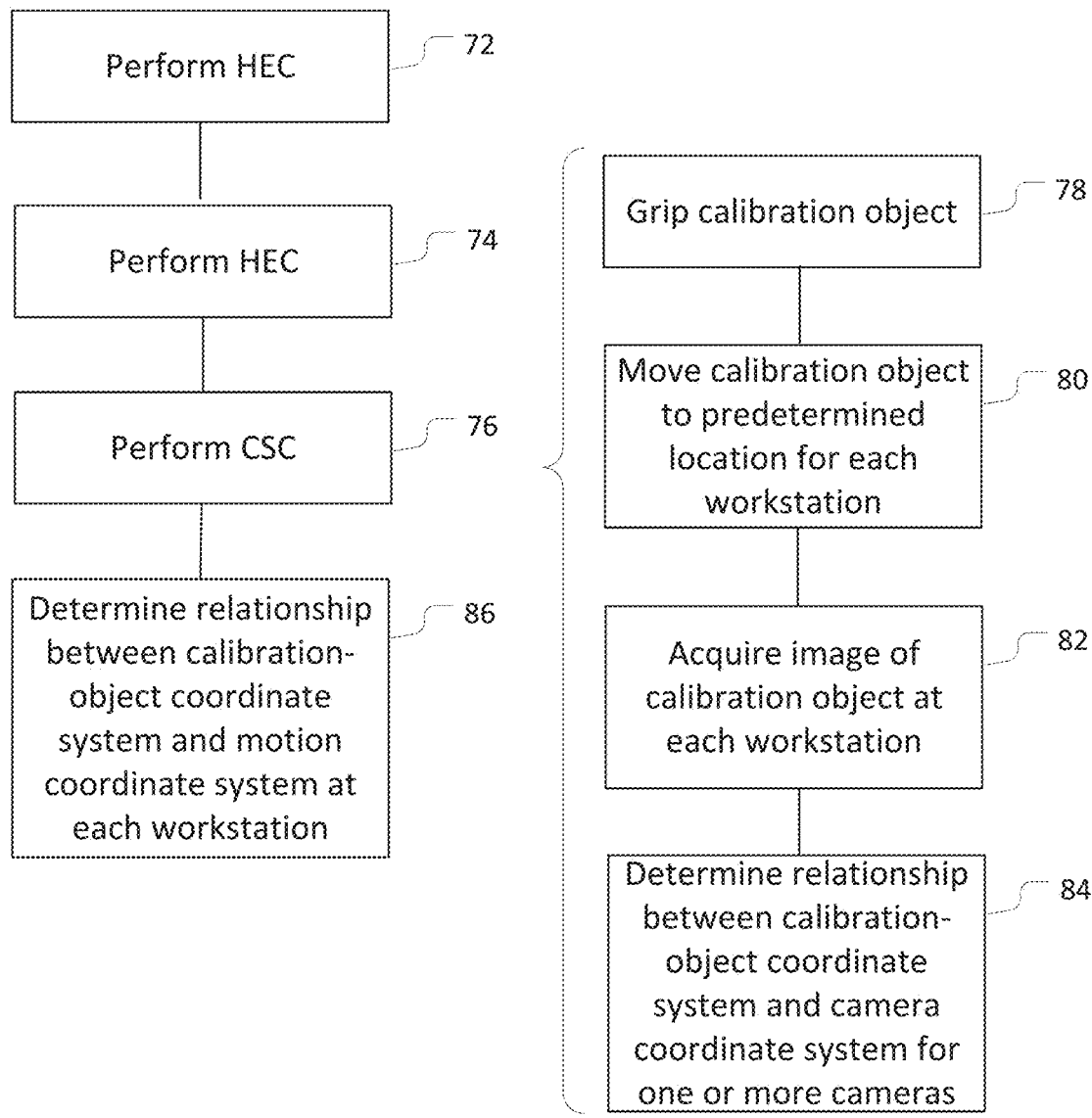
FIG. 2 is a flow chart illustrating a calibration method for a VBM system, such as the VBM system of FIG. 1, according to some embodiments of the invention.

FIG. 2 illustrates a calibration method 70 that generally can be implemented with regard to the VBM system 20, as described above, or with regard to any number of other VBM systems. As also generally noted above, it will be understood that the particular coordinate systems employed and other parameters in the method 70 are presented as examples only. Likewise, the particular order of operations discussed below is also presented as an example only.

Generally, in order to calibrate the VBM system 20 for operations that span both of the workstations 24, 26, a hand-eye calibration ("HEC") can be performed (i.e., executed) 72, 74 for the robot 22 and one or more (e.g., each) of the camera 28, 30, respectively. Generally, in the context of the VBM system 20, execution 72, 74 of a respective HEC can calibrate the coordinate systems 52, 54 of the cameras 28, 30, respectively, to the motion coordinate system 50.

Generally, the goal of the HEC to be performed 72, 74 is to determine the relationship the camera(s) and the motion coordinate system (e.g., to determine rigid body poses of the cameras or calibration objects in the motion coordinate system, intrinsic parameters of a camera, such as lens or perspective distortion, non-rigid parameters of a motion stage, such as scaling of each degree of freedom of the motion stage and skew between motion axes, and so on). As noted above, in the current example calibration of the VBM system 20, the coordinate system 50 of the robot 22 is utilized as the motion coordinate system, such that HEC results in the poses and motion being described/interpreted in the motion coordinate system 50. In other implementations, other choices are possible.

An HEC can be executed in a number of different ways. In some cases, for example, the calibration plate 58 can be presented at a number of different poses to each of the cameras 28, 30 and each of the cameras 28, 30 can acquire an image of the calibration plate 58 at each such pose. A resulting system of equations can then be solved (or approximately solved) in order to determine a transform between the coordinate system 52, 54, respectively, and the coordinate system 50.

In the example presented herein, the cameras 28, 30 are fixed in place, and the calibration plate 58 is moved. In other embodiments, one or both of the cameras 28, 30 can be moved relative to the plate 58.

Still referring to FIG. 2, the method 70 can also include performing 76 a cross-station calibration (CSC) for the robot 22 and the workstations 24, 26. Generally, the CSC can calibrate each of the cameras 28, 30 to separate instances of a common coordinate system, such as the calibration-object coordinate system 56 defined by the calibration plate 58.

A CSC can be performed 76 in various ways. In some implementations, a CSC can be performed 76 in a manner that varies from, but is somewhat related to a "single-view" calibration. For example, under conventional single-view approaches, each system camera may be calibrated relative to the coordinate system of a fixed calibration plate. In contrast, under the method 70, the calibration plate can be moved between the two workstations 24, 26 for imaging by the two cameras 28, 30, respectively at predetermined points.

For example, performing 76 a CSC can include gripping 78 the calibration plate 58 with the robot 22, then using the robot 22 to move 80 the calibration plate 58 to the point 24a (or other predetermined point) at the workstation 24. The camera 28 can then be used to acquire 82 one or more images of the calibration plate 58 at the point 24a.

Further, performing 76 a CSC can include still gripping 78 the calibration plate 58 with the robot 22, then using the robot 22 to move 80 the calibration plate 58 to the point 26a (or other predetermined point) at the workstation 26. The camera 30 can then be used to acquire 82 one or more images of the calibration plate 58 at the point 26a.

For at least one image acquired with the calibration plate 58 at each of the points 24a, 26a, the method 70 can then include determining 84 a relationship between the calibration-object coordinate system 56 and the respective coordinate system 52, 54 of the camera 28, 30. For example, a transform can be determined between the calibration-object coordinate system 56 and the camera coordinate system 52 at the first workstation 24, and a potentially different transform can be determined between the calibration-object coordinate system 56 and the camera coordinate system 54 at the second workstation 26.

As appropriate, the method 70 can then further include determining 86 a relationship (e.g., a transform) between the calibration-object coordinate system 56 and the motion coordinate system 50 at each workstation 24, 26, based on the previously performed CSC and HEC operations (e.g., as discussed above). For example, the results of the CSC operations discussed above can be used to transform from the calibration-object coordinate system 56 to the pixel coordinate system 52, 54 at either workstation 24, 26, and then the results of the HEC operations discussed above can be used to transform from the pixel coordinate systems 52, 54 at either workstation 24, 26 to the motion coordinate system 50 at that workstations 24, 26.

Generally, once the relationships described above (or other appropriate coordinate-system relationships) have been established, it may be possible to execute operations that span the relevant workstations (e.g., the workstations 24, 26), while accounting for the error that may occur during movement between the workstations (e.g., due to the relatively large scale movement of the controllable motion system that may be required).

Figure 3:
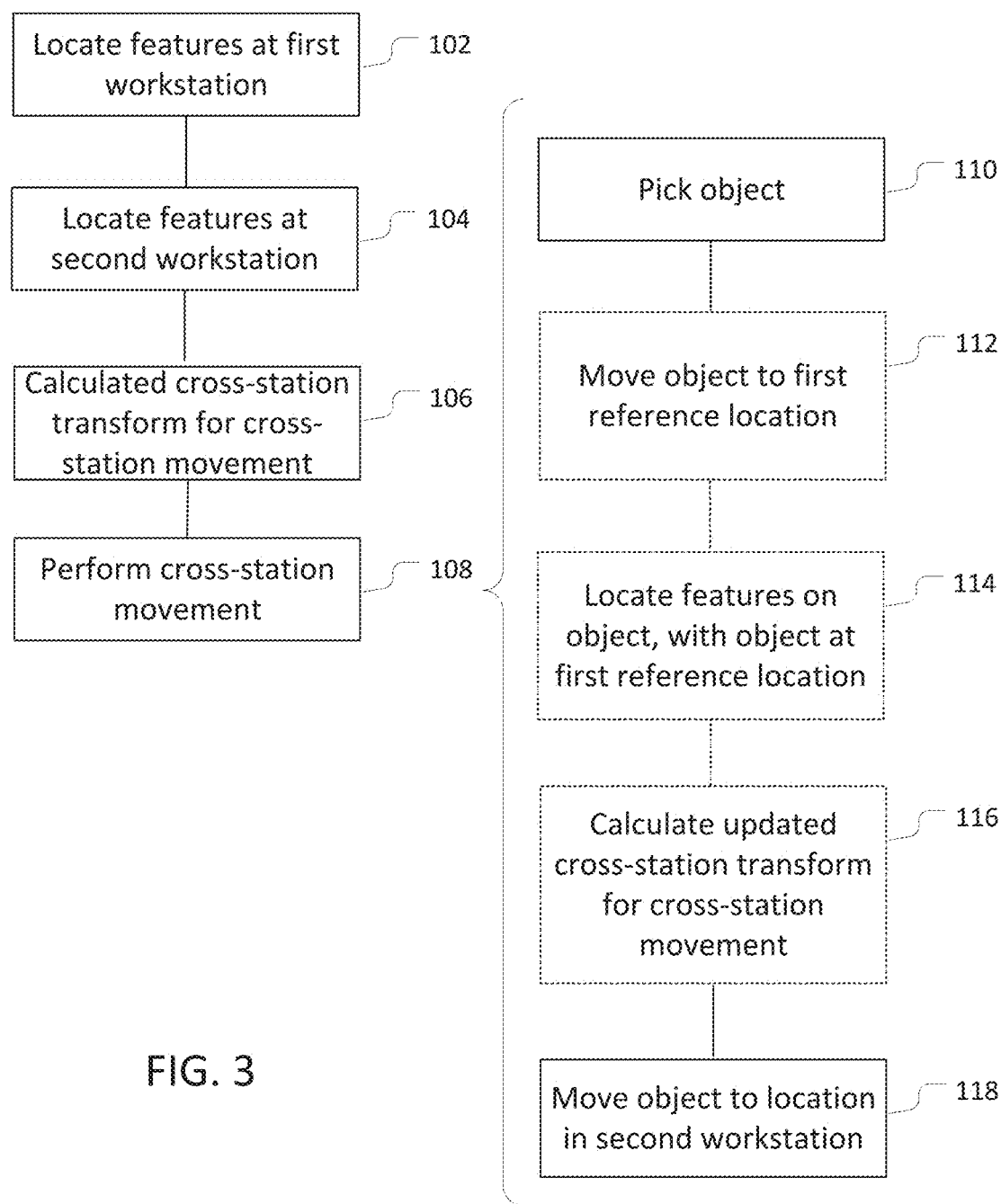
FIG. 3 is a flow chart illustrating an operational method for a VBM system, such as the VBM system of FIG. 1, according to some embodiments of the invention.

In this regard, FIG. 3 illustrates an example method 100 for assembling two parts together across two workstations. Other operations are possible, based on similar principles, and the concepts generally discussed above.

In the example illustrated, the method 100 may be generally based on a previous implementation of a calibration operation, in order to establish relationships between a calibration-object coordinate system, various coordinate systems of the relevant cameras, and the relevant motion coordinate system (e.g., the coordinate system of the relevant controllable motion system). For example, as a basis to operations of the method 100, it may be useful to implement one or more operations of the method 70 (see FIG. 2), including the determining 86 of appropriate relationships between calibration-object and other coordinate systems.

With the relevant VBM system appropriately calibrated (e.g., via the method 70 or variations thereon), the assembly of the method 100 can proceed. For example, using the camera 28, one or more features on the object 36 (e.g., one or more corners or edges) can be located 102. Likewise, using the camera 30, one or more features of the object 38 can be located 104.

Generally, features (or other locations) can be located 102, 104 in any appropriate coordinate system. In some cases, it may be useful to locate 102, 104 certain features in the calibration-object coordinate system 56 at each workstation 24, 26. In other cases, other coordinate systems can be used.

With the relevant features having been located 102, 104, a cross-station transform to move the object 36 from the first workstation 24 to an appropriate position in the second workstation 26 can then be calculated 106. For example, a cross-station transform can be calculated 106 in order to move the first object 36 from a location in the first workstation 26 into precise alignment with the second object 38 in the second workstation 26.

As similarly noted above, the appropriate cross-station transform can be calculated 106 relative to any number of appropriate coordinate systems. In some implementations, consistent with the example above, when the relevant features have been located 102, 104 in the calibration-object coordinate system 56, it may be useful to also calculate 106 the transform relative to the calibration-object coordinate system 56.

A cross-station movement for the object 36 can then be performed 108 based on the calculated 106 transform. For example, the robot 22 can be commanded to pick the object 36 within the first workstation based on the located 102 features, then move the object 36 to a location within the second workstation based on the calculated 106 transform. In this regard, it will be recognized that appropriate transforms between coordinate systems may generally be required. For example, where features of the object 36 are located in the calibration-object coordinate system 56, it may be necessary to transform the relevant coordinates of the features to the motion coordinate system 50 (e.g., based on the results of the CSC and the HEC operations, as outlined above), then command the movement of the robot 22 accordingly.

In some cases, performing 108 a cross-station movement may include multiple movement operations, including operations designed to further correct for operational errors. For example, to account for pick errors by the robot 22 relative to the object 36, it may be useful to pick 110 the object 36, move 112 the object 36 to a first reference point (e.g., the predetermined point 24a, as was used when performing 76 the CSC (see FIGS. 1 and 2)), then again locate 114 features on the first object 36 (e.g., relocate the same features as were previously located 102).

Based on the locating 114 of the features of the first object 36 after it has been picked, any pick errors (e.g., due to slippage) can be identified and an updated cross-station transform can be calculated 116 for movement of the object 36 from the first reference point to the desired location at the second workstation 26 (e.g., a place location for the object 36, on top of the object 38). The object 36 can then be moved 118 to the desired location.

In this final movement (or preceding series of movements), it should again be recognized that locations or transforms need not necessarily be identified or calculated in the calibration-object coordinate system, although this may be useful in some implementations. Rather, using the pre-established relationships between coordinate systems (e.g., as determined by performing 72, 74, 76 HEC and CSC operations) substantial flexibility may be provided to use, and to move between, different relevant coordinate systems as appropriate.

Further, with regard to the discussion herein, it will be understood that moving an object to a location can include moving the object so that the object physically occupies the location, or moving a manipulator that is gripping the object, so that the manipulator physically occupies the location. For example, in the discussion above, the operation of moving 112 the object 36 to a reference location (e.g., the predetermined point 24a) may include moving an end-effector of the robot 22 to occupy the reference location, rather than necessarily moving the object 36 itself to occupy the reference location.

In different implementations, variations on the approaches discussed above are possible. For example, some aspects of the operations described above may be performed explicitly (e.g., discretely) in some implementations, but as part of a continuous movement in others. For example, still referring to FIG. 3, some implementations can include the discrete operations of: moving the 112 an object to a first reference point (e.g., the predetermined point 26a), as a starting point of an underlying repeatable cross-station movement; moving 118 the object from the first reference point to a second point (e.g., the predetermined point 24a) to execute the underlying repeatable cross-station movement; and performing an adjustment motion to compensate for factors such as pick slippage and place offset, so that the object can be finally placed at a desired position.

In contrast, some implementations can combine certain of potentially discrete operations into continuous (e.g., combined) operations (e.g., continuous movements). For example, potentially discrete movements between first and second reference points within first and second workstations (e.g., predetermined points 24a and 26a), and from the second reference point to a final location according to an adjustment that compensates for slippage or other errors, can sometimes be combined into a single continuous movement that may not include actual movement to the second reference point (e.g., predetermined point 26a) at all. While this continuous approach may sometimes result in somewhat decreased accuracy (e.g., as compared to the discrete approach noted above), it may usefully result in faster cycle times, with acceptable accuracy.

In some implementations, the method 100 (and other methods according to the invention) can be generalized to apply to a variety of operations, including for non-assembly operations. For example, in place of locating features, the method 100 can be implemented to identify locations (e.g., locations not on a particular part) for one or more operations in a first workstation (or elsewhere).

Thus, embodiments of the disclosed invention can provide an improved system or method for operation of VBM systems. In some embodiments, for example, implementation of the disclosed system or method can result in relatively high accuracy for cross-station motions (e.g., mechanical transport of a work object), even where absolute accuracy for relevant motion systems is not attainable (but, for example, when motion system error is substantially repeatable).

For example, in some implementations, relationships between HECs at different workstations can be determined in order to provide relatively accurate cross-station movements. For example, in some arrangements, a position (X,Y) of a calibration-object coordinate system may be determined as a position (U1, V1) in a motion coordinate system under a first HEC (e.g., at a first workstation), and as position (U2, V2) in the motion coordinate system under a second HEC (e.g., at a second workstation). Using a system or method, such as the examples described above, can allow for the relevant motion system to execute a set operation that can appropriately execute a cross-station movement between (U1, V1) and (U2, V2).

In this regard, under embodiments of the invention, appropriate operational movement can be obtained even when the relevant motion system is not necessarily accurate in an absolute sense. For example, in the example immediately above, even if the described cross-station movement is subject to relatively repeatable slippage (or other relatively repeatable error in the motion system), the correspondence between (U1, V1) and (U2, V2) can be maintained. As such, for example, it can be seen that the determination of an absolute, independent relationship between the two noted HECs is not necessarily required. Rather, appropriately accurate run-time operation may generally depend only on a particular "incidental" relationship between the two HECs, as related by the associated "incidental" cross-station movement. Although different mappings between HECs may result for different cross-station movements, a particular mapping can be readily determined for each particular cross-station movement, and used thereafter for repeatable operation. In this regard, for example, the mathematical characterization of a cross-station calibration can generally be viewed as a function of the relevant HECs and particular cross-station movements.

As similarly discussed above, the operations disclosed herein can be implemented in digital electronic circuitry, or in computer hardware, firmware, software, or in combinations of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network. A depicted processor, component, or module can be combined with any other processor, component, or module or divided into various sub-processors, subcomponents, or submodules. Such can be variously combined according to embodiments herein.

Operations of methods disclosed herein steps can be performed by one or more programmable processors executing a computer program to perform functions of the technology by operating on input data and generating output. Operations of methods can also be performed by, and apparatuses can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer also includes, or be operatively coupled to receive data from or transfer data to, or both, one or more mass storage devices for storing data, e.g., magnetic, magneto-optical, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the above described operations can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described operations can be implemented in a distributed computing system that includes a back-end component, e.g., as a data server, and/or a middleware component, e.g., an application server, and/or a frontend component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

While the invention has been described with reference to example embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of calibrating a vision-based manipulation ("VBM") system that includes a first workstation, a second workstation at least partly separate from the first workstation, a camera system configured to capture images of one or more work objects in the first and second workstations, and a controllable motion system, the method comprising:
   performing a hand-eye calibration ("HEC") with the controllable motion system and the camera system at the first workstation;
   performing a HEC with the controllable motion system and the camera system at the second workstation;
   performing a cross-station calibration ("CSC") for the controllable motion system and the first and second workstations, wherein performing the CSC comprises:
      using the controllable motion system, moving a calibration object to a first point at the first workstation to define a first instance of a calibration-object coordinate system;
      imaging the calibration object at the first point;
      using the controllable motion system, moving the calibration object to a second point at the second workstation to define a second instance of the calibration-object coordinate system;
      imaging the calibration object at the second point; and
      for at least one camera of the camera system, determining a transform between each of the first and second instances of the calibration-object coordinate system and a corresponding pixel space coordinate system of the at least one camera;
   determining a relationship between the CSC and the HEC of the first workstation; and
   determining a relationship between the CSC and the HEC of the second workstation.

2. The method of claim 1, wherein performing the CSC further comprises:
   gripping the calibration object with the controllable motion system to move the calibration object to the first and second points.

3. The method of claim 1, wherein the camera system includes a first camera at the first workstation and a second camera at the second workstation.

4. The method of claim 3, wherein at least one of the first and second cameras is a fixed-location camera.

5. The method of claim 1, wherein the camera system includes at least one mobile camera.

6. The method of claim 5, wherein the at least one mobile camera is configured to move between different locations to capture images.

7. A method of using a vision-based manipulation ("VBM") system to execute an operation with a work object at a first workstation and at a second workstation that is at least partly separate from the first workstation, the VBM system including a camera system configured to capture images of the first and second workstations, and a controllable motion system configured to command movements within a motion coordinate system, the camera system and the controllable motion system defining a first hand-eye calibration ("HEC") for the first workstation and a second HEC for the second workstation, the method comprising:
   performing a cross-station calibration to determine a first cross-calibration relationship between a first instance of a calibration-object coordinate system and the first HEC and to determine a second cross-calibration relationship between a second instance of the calibration-object coordinate system and the second HEC, the first and second cross-calibration relationships being determined based on a calibration object that is gripped by the controllable motion system and imaged at the first workstation and at the second workstation, respectively;
   locating one or more features of the work object at the first workstation, using the camera system;
   calculating a cross-station transform for moving the work object to a target location at the second workstation, based at least partly on the cross-station calibration; and
   moving the work object to the target location, using the controllable motion system, based on the calculated cross-station transform.

8. The method of claim 7, wherein moving the work object includes locating the work object at the first workstation based at least in part on the first cross-calibration relationship.

9. The method of claim 8, wherein moving the work object includes picking the work object at the first workstation, using the controllable motion system, based on a transform from the first instance of the calibration-object coordinate system to the motion coordinate system using the first HEC.

10. The method of claim 7, wherein moving the work object to the target location includes:
   picking the work object at the first workstation, using the controllable motion system;
   moving the work object, using the controllable motion system, to a first reference point of the first workstation;
   with the work object at the first reference point, relocating the one or more features of the work object, using the camera system; and
   calculating an updated cross-station transform to move the work object from the reference point to the target location.

11. The method of claim 10, wherein the first reference point is a point at which the calibration object was imaged at the first workstation for the cross-station calibration.

12. The method of claim 10, wherein, with the work object at the first reference point, the one or more features of the work object are relocated in the first instance of the calibration-object coordinate system.

13. The method of claim 7, wherein the calibration object is a 2D calibration plate.

14. The method of claim 7, wherein the target location is determined based on locating one or more features of a second work object at the second workstation.

15. The method of claim 14, wherein the one or more features of the second work object are located at the second workstation based at least in part on the second cross-calibration relationship.

16. The method of claim 15, wherein the one or more features of the second work object are located at the second workstation in the second instance of the calibration-object coordinate system.

17. A vision-based manipulation ("VBM") system comprising:
   a first workstation;
   a second workstation that is at least partly separate from the first workstation;
   a camera system configured to capture images of one or more work objects in the first and second workstations;
   a controllable motion system configured to command movements within a motion coordinate system; and
   one or more processor devices configured to:
      perform a first hand-eye calibration ("HEC") for the camera system and the controllable motion system at the first workstation;
      perform a second HEC for the camera system and the controllable motion system at the second workstation;
      perform a cross-station calibration to determine a first cross-calibration relationship between a first instance of a calibration-object coordinate system and the first HEC and a second cross-calibration relationship between a second instance of the calibration-object coordinate system and the second HEC, the first and second cross-calibration relationships being determined based on causing the camera system to acquire, at the first workstation and at the second workstation, one or more images of a calibration object that is gripped by the controllable motion system.

18. The VBM system of claim 17, wherein the one or more processor devices are further configured to:
   locate one or more features of a work object at the first workstation, based on one or more images acquired by the camera system;
   calculate a cross-station transform for using the controllable motion system to move the work object to a target location at the second workstation, based at least partly on the cross-station calibration; and
   cause the controllable motion system to move the work object to the target location, based on the calculated cross-station transform.

19. The VBM system of claim 18, wherein causing the controllable motion system to move the work object to the target location includes:
   causing the controllable motion system to pick the work object at the first workstation and move the work object to a first reference point of the first workstation;
   causing the camera system to image the work object, with the work object at the first reference point, to relocate the one or more features of the work object; and
   calculating an updated cross-station transform to move the work object from the reference point to the target location.

20. The VBM system of claim 19, wherein the camera system includes a first fixed 2D camera disposed to acquire images of the first workstation, and a second fixed 2D camera disposed to acquire images of the second workstation; and
   wherein the first cross-calibration relationship is determined for the first camera, and the second cross-calibration relationship is determined for the second camera.

* * * * *